United States Patent
Matsui et al.

(10) Patent No.: US 6,484,470 B1
(45) Date of Patent: Nov. 26, 2002

(54) MEMBER FIXING DEVICE

(75) Inventors: Isamu Matsui, Kyoto (JP); Takashi Nakao, Neyagawa (JP); Isao Fukuda, Kameoka (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 50 days.

(21) Appl. No.: 09/721,642

(22) Filed: Nov. 27, 2000

(30) Foreign Application Priority Data

Nov. 29, 1999  (JP) .......................................... 11-337292

(51) Int. Cl.[7] .............................. E04B 1/38; E04C 5/00
(52) U.S. Cl. ........................................................ 52/698
(58) Field of Search ......................... 52/220.1, 506.05, 52/698, 198, 302.1; 248/674, 680, 678

(56) References Cited

FOREIGN PATENT DOCUMENTS

JP    11-67874    3/1999

*Primary Examiner*—Carl D. Friedman
*Assistant Examiner*—Steve Varner
(74) *Attorney, Agent, or Firm*—Armstrong, Westerman & Hattori, LLP

(57) ABSTRACT

The present invention enables a member to be accurately fixed to a floor. With tapped holes 5 in a member mounting section 2 accurately aligned with marks formed in a grating 20 so as to correspond to through-holes 9, a bolt 14 is screwed in an internal thread cylinder 23 (fixed in a vent hole 21 in the grating 20) through a through-hole 13 in a presser plate 12 that can have its position changed relative to the member mounting plate 2, and the presser plate 12 is used to fix the member mounting plate 2 to the grating 20.

8 Claims, 1 Drawing Sheet

MEMBER FIXING DEVICE

FIELD OF THE INVENTION

The present invention relates to a member fixing device.

BACKGROUND OF THE INVENTION

A conventional member fixing order is shown below.

First, referencing a design drawing, an operator marks, with a line or the like, a position on a floor surface in which a member such as a machine is to be installed, and directly forms internal threads in this position or forms holes in this position through which internal thread cylinders are inserted for fixation. Subsequently, the member is placed in the installation position, and bolts are screwed in the internal threads through bolt through-holes.

This conventional member fixing means has the following disadvantage.

A disadvantage of the above described fixing means is that the member can be installed in the accurate position only if the internal threads are accurately formed in the floor.

SUMMARY OF THE INVENTION

To eliminate this disadvantage, the present invention employs the following means.

The present invention comprises a member mounting plate having an opening penetrating therethrough in a vertical direction, a presser plate for pressing an upper edge of the opening, and a fixing member having its upper end portion connected to the presser plate, the fixing member being fixed to the floor through the opening in the member mounting plate. There is a gap between an opening passage portion of the fixing member and an inner peripheral surface of the opening, and a position of the member mounting plate relative to the presser plate can be changed.

According to the above invention, there is a gap between the opening passage portion of the fixing member and the inner peripheral surface of the corresponding opening, and the position of the member mounting plate relative to the presser plate can be changed. Consequently, the member can thus be accurately mounted in a set position without the need to accurately set the positions of means formed in the floor for fixing the fixing members compared to the prior art.

In the present invention, the presser plate has at least two through-holes penetrating therethrough in a vertical direction, the fixing member is a bolt having a head section abutting on an edge of the through-hole, and the bolt is fitted through one of the through-holes from above and screwed in a corresponding one of tapped holes formed in the floor, through the opening in the member mounting plate.

According to the above invention, the relative position between the bolt and the presser plate can be changed. Consequently, this increases the degree of freedom in adjusting the position of the member mounting plate.

In the present invention, the member mounting plate has a recess formed substantially centrally, the recess has the opening substantially concentrically formed in a bottom portion thereof, the presser plate presses the upper edge of the opening, and the head of the bolt does not project upward from a top surface of the member mounting plate when the presser plate is fixed.

According to the above invention, the head of the bolt does not project upward from the top surface of the member mounting plate, that is, a surface on which the member is mounted. Consequently, the bolt head or the presser plate does not obstruct a member mounting operation.

The present invention is a member fixing device for fixing a member to a floor comprising a porous plate, the device comprising a member mounting plate having an opening penetrating therethrough in a vertical direction, internal thread members each inserted through and fixed in a corresponding one of holes in the floor, and external thread members each screwed in a corresponding one of the internal thread members, the member mounting device being fixed to the floor via the opening using the external thread members and the internal thread members.

According to the above invention, the holes formed in the floor are used and the internal thread members are inserted and fixed from above, so that the internal thread members can be easily fixed in the holes in the floor. As a result, the member mounting plate can be easily mounted in the set position.

In the present invention, the member mounting plate is fixed to the floor further via a presser plate for pressing an upper edge of the opening, the presser plate has a plurality of through-holes through which the external thread members are inserted, and the external and internal thread members are tightened together to integrally fix the presser plate and the member mounting plate to the floor.

According to the above invention, the relative position between the bolt and the presser plate can be changed. Consequently, this increases the degree of freedom in adjusting the position of the member mounting plate.

In the present invention, the member mounting plate has a recess formed substantially centrally, the recess has the opening substantially concentrically formed in a bottom portion thereof, the presser plate presses the upper edge of the opening, and the head of the bolt does not project upward from a top surface of the member mounting plate when the presser plate is fixed.

According to the above invention, the head of the bolt does not project upward from the top surface of the member mounting plate, that is, a surface on which the member is mounted. Consequently, the bolt head or the presser plate does not obstruct a member mounting operation.

In the present invention, the floor belongs to a clean room.

According to the above invention, the member can be fixed without the need to specially process a floor of a clean room. Consequently, even if the member fixed position is changed due to a change in the layout or the like, a decrease in cleanliness caused by dusts can be prevented.

In the present invention, a member mounted by the member mounting plate is a guide rail for a cart running on the floor.

According to the above invention, the guide rail can be more easily mounted. Consequently, this can reduce a construction period for a tracked cart.

DETAILED DESCRIPTION OF THE PREFERRED EMBODIMENTS

An embodiment of the present invention will be described below.

Figure 1:
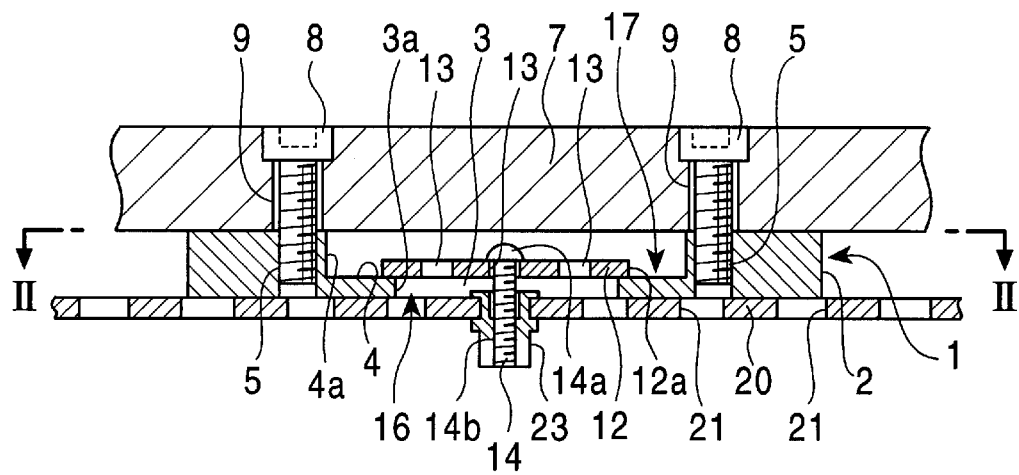
FIG. 1 is a vertical sectional view of an integral part of an embodiment of the present invention.
Figure 2:
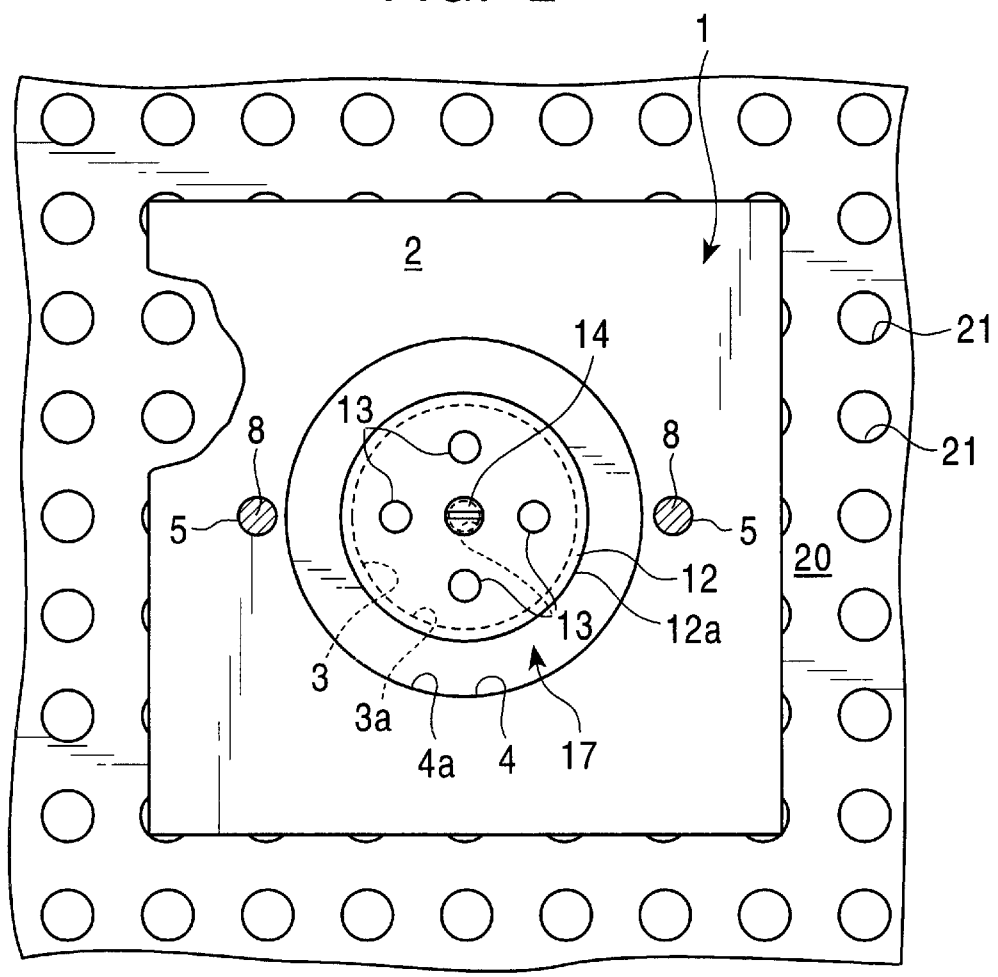
FIG. 2 is a partly exploded sectional view taken along line II—II in FIG. 1.

In the description, the term "front" refers to the right of FIG. 1, the term "rear" refers to the left thereof, the term "left" refers to the rear of the sheet of the drawing, and the term "right" refers to the front of the sheet of the drawing.

A member mounting plate 2 that is a constituent of a member fixing device 1 has an opening 3 penetrating therethrough in a vertical direction. The opening 3 is formed substantially concentrically in a bottom portion of a recess 4 formed substantially centrally in the member mounting plate 2. At least one and in this embodiment, two tapped holes 5 are formed in the member mounting plate 2 in a portion other than the recess 4 in such a manner that their axes extend in the vertical direction.

A guide rail 7 (referred to as the "member" in the claims) with its longitudinal direction corresponding to a direction from front to rear is fixed to the member mounting plate 2 in the following manner. That is, the guide rail 7 has through-holes 9 (each having a recess in which a head of a bolt 8 sinks) each penetrating through in the vertical direction in such a manner that their axes align with axes of the corresponding tapped holes 5. By screwing the bolt 8 in the corresponding tapped hole 5 through the corresponding through-hole 9, the guide rail 7 is fixed to the member mounting plate 2. In this state, the relative position between the member mounting plate 2 and the guide rail 7 is automatically determined.

A presser plate 12 for pressing an upper edge (the bottom portion of the recess 4) of the opening 3 in the member mounting plate 2 has at least one and in this embodiment, five through-holes 13 penetrating therethrough in the vertical direction.

A bolt 14 (referred to as the "fixing member" in the claims) is fitted in one of the through-holes 13 so that its head 14a abuts on an upper peripheral edge of the through-hole 13. This is an example of the state in which the bolt 14 and the presser plate 12 are connected together.

By fitting the bolt 14 in another through-hole 13, the relative position between the bolt 14 and the presser plate 12 can be changed.

A gap 16 is formed between an inner peripheral surface 3a of the opening 3 in the member mounting plate 2 and a threaded portion 14b of the bolt 14, and a gap 17 is formed between a side peripheral surface 4a of the recess 4 and an outer peripheral surface 12a of the presser plate 12. This configuration enables the position of the member mounting plate 2 relative to the presser plate 12 to be changed.

In addition, the presser plate 12 and the head 14a of the bolt 14 are fitted in the recess 4 so as not to project upward from a top surface of the member mounting plate 2.

Next, usage of the embodiment of the present invention will be described with reference to an example in which the guide rail 7 (referred to as the "member" in the claims) is fixed to a grating 20 (a porous plate having a large number of vent holes 21 penetrating therethrough in the vertical direction) constituting a floor of a clean room. The guide rail 7 guides an unmanned cart running through a clean room.

The grating 20 is mounted using a mounting member (not shown in the drawings) provided on a surface of the floor of the building.

First, referencing a design drawing or the like, an operator marks, with a line or the like, a position on the grating 20 in which the guide rail 7 is to be installed, and also marks portions of the grating 20 corresponding to the through-holes 9 in the guide rail 7.

Subsequently, with the tapped holes 5 aligned with the marks corresponding to the through-holes 9, the positions of the member mounting plate 2 and the presser plate 2 are adjusted, and the through-hole 13 (one of the five through-holes 13) is determined which aligns with the vent hole 21 in the grating 20 in such a manner that a deviation in the relative position between the member mounting plate 2 and the presser plate 12 is minimized. A well-known internal thread cylinder 23 is fixed in the vent hole 21 aligning with the determined through-hole 13. After inserted through the vent hole 21, the internal thread cylinder 23 is fixed to peripheries of the vent hole 21 by using a predetermined tool to deform a plastically deformed cylindrical portion thereof (with no internal thread formed therein) projecting downward from the vent hole 21 so that a peripheral edge of the vent hole 21 is gripped by an upper flange portion thereof and a portion thereof expanded outward due to the plastic deformation. Of course, a predetermined gap is also formed between the upper flange of the internal thread cylinder 23 and the inner peripheral surface 3a of the opening 3 so that the upper flange of the internal thread cylinder 23 does not regulate horizontal movement of the member mounting plate 2.

Subsequently, with the tapped holes 5 accurately aligned with the marks corresponding to the through-holes 9, the bolt 14 is screwed in the internal thread cylinder 23 through the through-hole 13 and the presser plate 12 is used to fix the member mounting plate 2 to the grating 20.

In this manner, the tapped holes 5 can be accurately located at set positions of the grating 20. As is apparent from the description, the widths of the gaps 16 and 17 are determined so as not to obstruct the above described operation.

Subsequently, the guide rail 7 is placed on the member mounting plate 2, and the bolts 8 are screwed in the tapped holes 5 through the through-holes 9. As described above, since the tapped holes 5 are located at the set positions, the guide rail 7 is automatically located in a set position of the grating 20.

Variations or the like will be described below.

(1) The presser plate 12 and the bolt 14 may be integrated together, and the fixing member has only to be able to use the hole previously formed in the floor and is not limited to the bolt 14.

(2) If the presser plate 12 and the bolt 14 are not integrated together, at least one through-hole 13 has only to be formed in the presser plate 12.

(3) The member (that is fixed to the floor) is not limited to the guide rail 7. In addition, an arbitrary fixing means may be used to fix the member to the member mounting plate 2.

(4) Of course, the present member fixing device can be used to fix the member to a surface other than that of the floor.

(5) If the member can be fixed to the member mounting plate 2 so as not to interfere with the presser plate 12 or the bolt 14, the recess 4 may be omitted.

(6) The structure of the internal thread cylinder 23 is arbitrary.

(7) The floor is not limited to the grating 20.

What is claimed is:

1. A member fixing device characterized by comprising a member mounting plate having an opening penetrating therethrough in a vertical direction, a presser plate for pressing an upper edge of the opening, and a fixing member having its upper end portion connected to the presser plate, the fixing member being fixed to the floor through the opening in the member mounting plate, wherein there is a gap between an opening passage portion of the fixing member and an inner peripheral surface of the opening and a position of the member mounting plate relative to the presser plate can be changed.

2. A member fixing device according to claim 1, characterized in that said presser plate has at least two through-holes penetrating therethrough in a vertical direction, the fixing member is a bolt having a head section abutting on an edge of the through-hole, and said bolt is fitted through one of the through-holes from above and screwed in a corresponding one of tapped holes formed in the floor, through the opening in the member mounting plate.

3. A member fixing device according to claim 2, characterized in that said member mounting plate has a recess formed substantially centrally, the recess has said opening substantially concentrically formed in a bottom portion thereof, said presser plate presses the upper edge of the opening, and the head of the bolt does not project upward from a top surface of the member mounting plate when the presser plate is fixed.

4. A member fixing device for fixing a member to a floor comprising a porous plate, the device being characterized by comprising a member mounting plate having an opening penetrating therethrough in a vertical direction, internal thread members each inserted through and fixed in a corresponding one of holes in the floor, and external thread members each screwed in a corresponding one of the internal thread members, the member mounting device being fixed to the floor via said opening using the external thread members and the internal thread members.

5. A member fixing device according to claim 4, characterized in that said member mounting plate is fixed to the floor further via a presser plate for pressing an upper edge of said opening, the presser plate has a plurality of through-holes through which the external thread members are inserted, and the external and internal thread members are tightened together to integrally fix the presser plate and the member mounting plate to the floor.

6. A member fixing device according to claim 5, characterized in that said member mounting plate has a recess formed substantially centrally, the recess has said opening substantially concentrically formed in a bottom portion thereof, said presser plate presses the upper edge of the opening, and the head of the bolt does not project upward from a top surface of the member mounting plate when the presser plate is fixed.

7. A member fixing device according to any one of claims 4 to 6, characterized in that said floor belongs to a clean room.

8. A member fixing device according to any one of claims 1 to 6, characterized in that a member mounted by said member mounting plate is a guide rail for a cart running on the floor.

* * * * *